(12) United States Patent
Weber et al.

(10) Patent No.: US 12,296,370 B2
(45) Date of Patent: May 13, 2025

(54) METHOD FOR MARKING A STEEL STRIP, AND STEEL STRIP WITH A PLURALITY OF MARKERS

(71) Applicant: ThyssenKrupp Steel Europe AG, Duisburg (DE)

(72) Inventors: Wolfram Weber, Dinslaken (DE); Lothar Patberg, Moers (DE); Daniel Overlöper, Duisburg (DE); Thorsten Grünendick, Mülheim a. d. Ruhr (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 18/092,972

(22) PCT Filed: Jul. 12, 2021

(86) PCT No.: PCT/EP2021/069372
§ 371 (c)(1),
(2) Date: Jan. 4, 2023

(87) PCT Pub. No.: WO2022/013169
PCT Pub. Date: Jan. 20, 2022

(65) Prior Publication Data
US 2024/0246131 A1    Jul. 25, 2024

(30) Foreign Application Priority Data
Jul. 15, 2020 (DE) .......................... 102020208818.7

(51) Int. Cl.
*B21C 51/00* (2006.01)
(52) U.S. Cl.
CPC ................................ *B21C 51/005* (2013.01)

(58) Field of Classification Search
CPC ..................... G01N 2021/888; B21C 51/005
See application file for complete search history.

(56) References Cited

U.S. PATENT DOCUMENTS 6,585,163 B1    7/2003 Meunier et al.

FOREIGN PATENT DOCUMENTS

| DE | 3023070 A1 | 1/1982 |
| DE | 102016116723 A1 | 3/2018 |
| DE | 102018222180 A1 | 6/2020 |
| JP | H09134415 A | 5/1997 |
| JP | 2002192230 A | 7/2002 |
| JP | 2014076480 A | 5/2014 |
| KR | 20100107596 A | 10/2010 |
| WO | 0016982 A1 | 3/2000 |

OTHER PUBLICATIONS

German Office Action prior art for application DE 10 2020 208 818.7.
International Search Report and Written Opinion for International Application No. PCT/EP2021/069372 mailed Nov. 4, 2021.

*Primary Examiner* — Moshe Wilensky
(74) *Attorney, Agent, or Firm* — RMCK Law Group PLC

(57) ABSTRACT

A steel strip with a plurality of markers and a method for marking a steel strip with material properties is provided. The method comprises measuring material properties of the steel strip at a plurality of discrete strip positions. A plurality of markers are applied to the strip edge at the strip positions, each marker from the plurality of markers containing a material identifier relating to the measured material properties at the respective strip position of the marker.

8 Claims, 2 Drawing Sheets

Figure 1A:
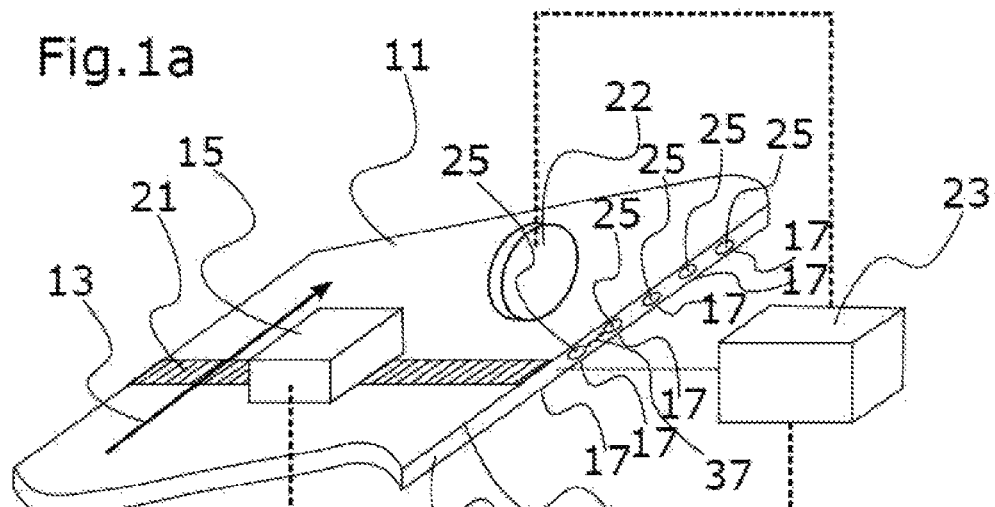

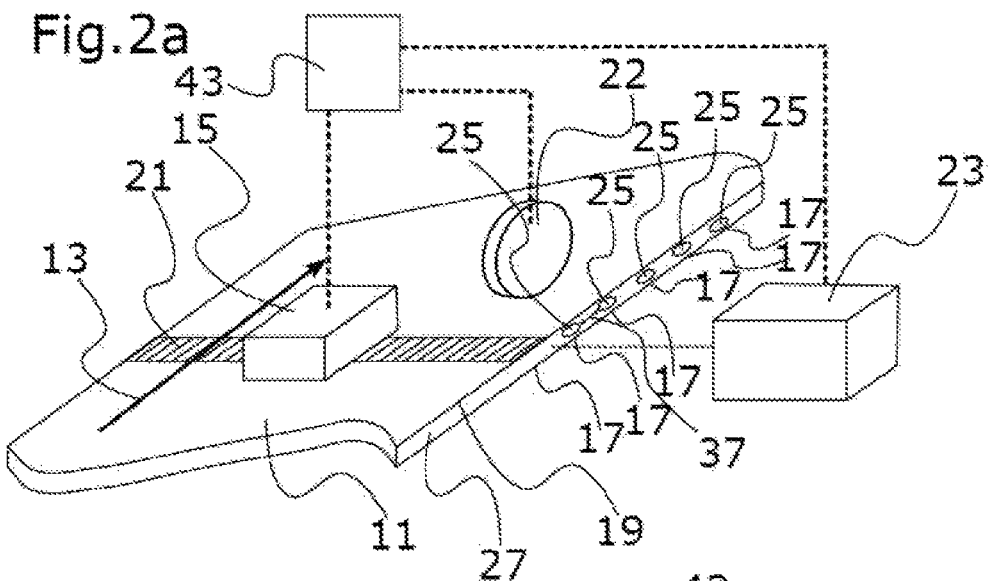
Fig.2a
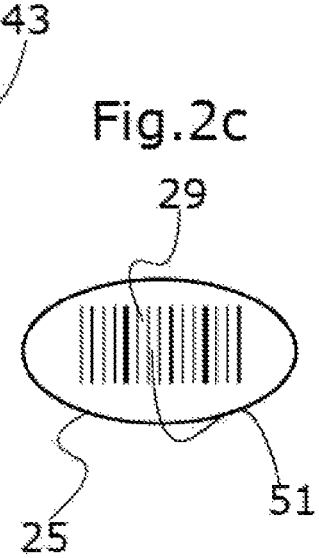
Fig.2b
Fig.2c
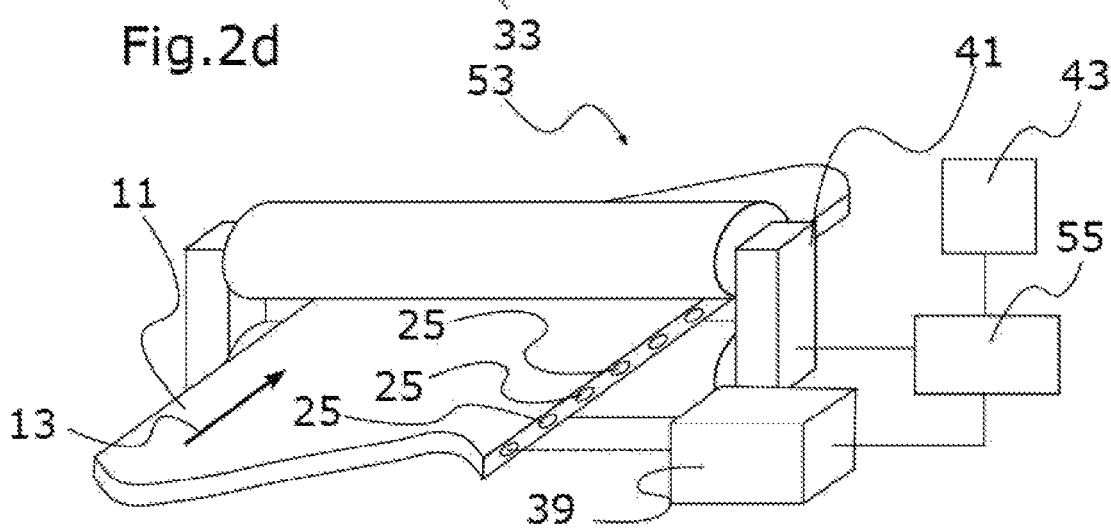
Fig.2d

METHOD FOR MARKING A STEEL STRIP, AND STEEL STRIP WITH A PLURALITY OF MARKERS

CROSS-REFERENCE TO RELATED APPLICATIONS

This application is a 371 U.S. National Stage of International Application No. PCT/EP2021/069372, filed Jul. 12, 2021, which claims the benefit of German Patent Application No. 10 2020 208 818.7 filed Jul. 15, 2020. The disclosures of each of the above applications are incorporated herein by reference in their entirety.

The invention relates to a method for marking a steel strip, a correspondingly marked steel strip, a set of steel strip and data container, and a method for processing steel strip or a set of steel strip and data container.

In the context of this application, a steel strip is understood to mean a flat steel product with a longitudinal side and a transverse side. This includes, in particular, coilable rolled products with thicknesses ranging from 1 mm to 4 mm, but also sheet metal with a thickness of 3 mm to 15 mm.

A steel strip is often provided with a marker to allow identification of the steel strip over the course of further processing. As a rule, the flat surface of the strip is used here to apply the marker.

The object of the present invention is to further develop the known marking methods.

This object is achieved by a method for marking a steel strip with material properties of the steel strip, comprising the following steps:
  measuring material properties of the steel strip at a plurality of discrete strip positions,
  applying a plurality of markers to the strip edge at the discrete strip positions, each marker from the plurality of markers containing a material identifier relating to the measured material properties at the respective strip position of the marker.

Since the material property is preferably a local material property which varies along the steel strip, different measurement values arise at the discrete strip positions. Consequently, each marker of the plurality of markers contains a material identifier relating to the different measured material properties at its respective strip position.

The object is also achieved by a steel strip set and a steel strip with markings and by methods for processing the steel strip set and methods for processing the steel strip, which will be described in more detail below. Many advantages of the invention are explained below only in relation to the marking method. The corresponding advantages likewise apply to the steel strip set, the steel strip with markings, and the methods for processing the steel strip set or the methods for processing the steel strip.

A discrete strip position is understood to mean a position along the longitudinal side of the steel strip. A material property present at a discrete strip position refers to material properties of a portion of the steel strip at this position along the longitudinal side. This means that the material property is measured on a band perpendicular to the longitudinal side of the steel strip at this position along the longitudinal side. The measurement is implemented using a measuring device in particular.

A plurality of markers are applied to the strip edge by, in particular, the steel strip being moved past a marking unit along the longitudinal direction of said steel strip, with the marking unit being arranged adjacent to the strip edge. This allows a large number of markers to be efficiently applied to the edge of the strip. The application is implemented using a marking device in particular.

The refined method has various advantages. Applying a plurality of markers ensures that a marker remains on the sections even when the steel strip is divided into smaller units. Consequently, re-marking the sections is not required after the division.

Moreover, the markers each contain a material identifier with regard to the material properties at the respective strip position of the marker. Hence, it is possible to measure spatially resolved material properties of the steel strip already during production and to link the measured material properties to the steel strip by way of the material identifier. This information cannot be lost even if the steel strip is divided into smaller units since the marker with the material identifier relating to the material properties is applied to precisely the discrete strip position at which the material properties are also measured. Without the referencing by way of the plurality of markers, complex material tracking would be required in order to extract the material properties of a strip section from the original measurement data of the entire strip during subsequent further processing of this strip section. By applying the markers directly to the strip positions at which the measurement was made, a mix-up of strip sections and hence incorrect assignments between strip sections and measurement data can be reliably prevented.

Application to the edge of the strip has the additional advantage that no usable area of the steel strip is lost as a result. The frequently implemented application to the flat strip surface can lead to impairment of the strip surface, for example to damage to the coating. In such a case, the part of the steel strip to which the marker is applied is not used in further processing. Thus, there is a certain amount of waste. This waste can be reduced as a result of application to the strip edge. Even if the surface damage is only minor, the paint finish can be impaired. Even if the marker does not damage the strip surface, it is necessary to remove the marker before finishing in order to use the part of the steel strip to which the marker has been applied. This additional process step, which consists in detaching the marker, can be saved as a result of application to the edge of the strip since the marker can usually simply remain here.

The measured material properties, which vary along the steel strip, can in particular be one or more of the following variables:
  local thickness of the steel strip
  local width of the steel strip
  local mechanical/technological properties
  local roughness
  local hidden or open material defects
  local coating thickness
  local oiling The fundamental advantage of the application according to the invention of a plurality of markers on the strip edge with locally assigned material properties is that the process parameters can be dynamically adjusted during further processing of the material. By way of example, these process parameters determine the parameters when forming or dividing the material with a defined and undefined cutting-edge geometry. A specific cutting-edge geometry is understood to mean, for example, blades and punches, while an undefined cutting-edge geometry is understood to mean, for example, grinding processes, laser beam cutting and water jet cutting.

Should the measured material properties comprise the local thickness of the steel strip, the following process parameters can be dynamically adjusted during further processing:

When forming: Forming forces, forming paths, gap settings

With a defined cutting-edge geometry: Cutting forces, gap settings

With an undefined cutting-edge geometry: Laser powers, pressure conditions, position of focal points, cutting speeds Should the measured material properties comprise the local width of the steel strip, the following process parameters can be dynamically adjusted during further processing:

When forming: Forming forces, forming paths, gap settings

With a defined cutting-edge geometry: Adjust cut positions and cut lengths

With an undefined cutting-edge geometry: Adjust cut positions and cut lengths

Should the measured material properties comprise local mechanical/technological properties or the local roughness of the steel strip, the following process parameters can be dynamically adjusted during further processing:

When forming: Forming forces, forming paths, gap settings

With a defined cutting-edge geometry: Cutting forces, gap settings

Should the measured material properties include local hidden or open material defects or the local coating thickness, the information can be used to avoid rejects or the delivery of defective parts. Corresponding portions of the steel strip can be sorted out entirely or used for components with less stringent requirements.

Should the measured material properties comprise the local oiling of the steel strip, the following process parameters can be dynamically adjusted during further processing:

When forming: Forming forces, forming paths, gap settings

With a defined cutting-edge geometry: Cutting forces, gap settings

In general: Requirement and strength of re-oiling

In a refined embodiment variant of the method, the method comprises the following steps:

assigning the measured material properties at the respective strip positions and optionally the discrete strip positions to data sets with unique data set identifiers, storing all data sets of a steel strip in a data container associated with the steel strip.

In this variant of the invention, the measured material properties are stored in a data container. This enables the recording and secure storage of relatively large amounts of information in comparison with the alternative, explained below, of applying the measured material properties directly to the steel strip. In the case of the alternative explained here, all material properties that were measured at a discrete strip position are compiled to form a data set (e.g., the values for width, thickness and roughness). This data set can also contain the strip position (e.g., measured in millimeters from one of the transverse sides). For further processing, the data set contains a unique data set identifier and is stored in a data container of the steel strip. The data set identifier is used to be able to assign the measured material properties to the measurement position. The data set identifier can be the strip position of the measurement itself, for example. Alternatively, the data set identifier can also consist of a sequential number with which the data set can be uniquely identified. The data set identifier can also be the location of the data set. By way of example, the data sets can be written successively to the data container, and so the position (e.g., the row or column) in the data container forms the data set identifier.

The data container can be in the form of a diagnostics file, for example, in which data relating to the steel strip are stored. Alternatively, the data container can also be designed as a database object in a material database. The material database then for example contains a respective database object for many steel strips, the data for a steel strip being stored in said database object.

In a development of the method, the material identifier is designed as a unique material identifier, each material identifier being assigned to a unique data set identifier such that this results in a unique assignment of each marker to a data set, with each marker being assigned to the data set which contains the material properties of its strip position. The material identifier with regard to the measured material properties is therefore designed as a reference to the assigned data set with the unique data set identifier. A typical example of such a reference from another context is a QR code that links to a website. In that case, the QR code contains the Internet address of the assigned website. Analogously, in the present case, the material identifier contains the information about which data set is assigned to this marker.

In a refined variant of the method, the method comprises the following steps:

compiling a set of production parameters of the steel strip,
storing the production parameters in the data container associated with the steel strip.

This development is advantageous in that even more information, specifically the production parameters, is stored in the data container for the steel strip. These production parameters are in particular the melt composition of the steel melt used, the rolling conditions, the details of the heat treatment, the details of the surface processing (e.g., skin-rolling steps), coating parameters in the case of a coated steel strip, etc. This additional information allows the further processing process to be controlled in a more targeted manner on the basis of the parameters. Furthermore, in the event of subsequently occurring material defects, it is easier to track the production step possibly responsible for the defect.

Alternatively or additionally, the method can be developed in such a way that it comprises the following steps:

creating a unique steel strip identifier,
storing the unique steel strip identifier in the data container associated with the steel strip.

A unique steel strip identifier, for example a unique identification number, is created for each steel strip, for example for each coil. This is additionally stored in the data container associated with the steel strip. In this way, it is possible to unambiguously track the melt associated with the corresponding steel portion and the production steps the steel strip has gone through, even at a later stage during further processing.

As an alternative or in addition to the explained use of a data container, the method can also be developed to the extent of the material identifier of each marker from the plurality of markers being designed as at least one material property at its strip position in coded or uncoded form. This is advantageous in that the material properties can be read out directly from the marker, without requiring access to a data container. This simplifies the logistics, for example, because when the steel strip is sold, only the steel strip itself and no data containers have to be delivered. Furthermore, this reduces the demands on the IT infrastructure if access to a data container is not required. Moreover, the process stability is increased at the same time, since a failure of the access options to the data container (e.g., an outage of the server with the data container database) does not have to lead to a stop in the further processing.

In the context of this application, a coded form means a curtailment of the measurement values (e.g., dispensing with the specification of units, powers of ten and measurement methods) and also an encryption of the numerical values.

In particular, each marker from the plurality of marks can also comprise a first material identifier and a second material identifier. In this case, the first material identifier is designed as a unique material identifier in accordance with the first variant mentioned, with each first material identifier being assigned to a unique data set identifier. By contrast, the second material identifier according to the second variant described is designed as at least one material property at the strip position in coded or uncoded form.

Additionally, the method can be developed in such a way that it comprises the following steps:
compiling a set of production parameters of the steel strip, and/or
creating a unique steel strip identifier,
with each marker from the plurality of markers containing the set of production parameters and/or the steel strip identifier in coded or uncoded form.

In addition to the material property, each marker therefore comprises a set of production parameters and/or the steel strip identifier in coded or uncoded form. Consequently, this ensures that also this information is available quickly and easily, even if the steel strip has been divided into smaller units and only a relatively small section of the steel strip is available.

Furthermore, each marker may optionally contain the strip position itself in coded or uncoded form. Thus, after dividing the steel strip into smaller units, the original order of the smaller units can be reconstructed.

In particular, the method is developed in such a way that each marker from the plurality of markers comprises an optically readable identification, in particular an alphanumeric character string, a bar code and/or a QR code. In particular, the material identifier contained in the marker is designed as an optically readable identification, in particular an alphanumeric character string, a bar code and/or a QR code. An optically readable identification is advantageous in that it can be applied in a simple manner using a laser marking unit and can be read out again using camera technology. Bar codes and QR codes are quickly and easily machine-readable. Then again, an alphanumeric character string is advantageous in that it can also be readily read by human workers (e.g., during an inventory of a material warehouse).

When using optical methods to read out markers with an optically readable identification, such as a bar code or a QR code, the usual readout speeds are between 40-140 kHz. This results in the geometric dimensions of the coding dependent on the arrangement between the strip edge and the optical beam path of the reading unit, taking into account the chosen optical detectors such as the resolution of the area or line scan cameras used.

Should the steel strip move along its longitudinal direction past a reading unit at a transport speed of 20 m/min, a single line width of approximately 300 μm in the longitudinal direction for a bar code is realistic with regards to the use of a line scan camera. To image the data content of the coding, this yields a total marking length of approximately 50 mm. If the transport speed is reduced, the required single line width and hence the required marking length are likewise reduced.

In a development of the method, each marker from the plurality of markers comprises a local structural change in the steel strip and/or a locally impressed remanent magnetic field. In particular, the material identifier contained in the marker is designed as a local structural change in the steel strip and/or a locally impressed remanent magnetic field. A local structural change can be impressed into the structure of the steel strip by a laser marking unit and can be read out using eddy current or leakage flux sensors.

The use of structural changes is advantageous in that these are not optically visible and can be painted over, for example, without impairing the paint finish. Furthermore, they are permanently present and can still be read out even if they have been painted over. Provided that the strip edge has not been removed during further processing, this information is retained even after forming. Consequently, the information remains available throughout the service life of the manufactured component without being disruptive.

A locally impressed remanent magnetic field can be applied to the strip edge using a magneto-inductive writing unit and can be read out again using sensors that are sensitive to magnetic fields.

The use of locally impressed remanent magnetic fields is advantageous in that these are not optically visible and can be painted over, for example, without impairing the paint finish. Furthermore, they are permanently present and can still be read out even if they have been painted over. Provided that the strip edge has not been removed during further processing, this information is retained even after forming. Consequently, the information remains available throughout the service life of the manufactured component without being disruptive.

When eddy current or leakage flux sensors are used as the reading unit, the dimensions of the markers are determined by the minimum size that a sensor must have in order to sense the magnetic field of the marker at the strip edge from a technically feasible distance. In this context, usual spatial resolutions are >1.5 mm. This yields an estimated length of the marker of ≥125 mm.

In a specific development of the method, the distance between adjacent markers is less than 2 m, in particular less than 1 m. The distance between adjacent markers is understood to mean the maximum of the distances of all markers to their respective adjacent markers. This ensures that even with the usual divisions into smaller units, at least one marker remains on the sections. By way of example, a maximum distance of 2 m between adjacent markers leads to at least one marker being arranged on a section of the steel strip with a length of more than 2 m. The distances are to be understood in the longitudinal direction of the steel strip in each case.

Typically, the markers are applied to the strip edge at regular intervals, with adjacent markers having the same distance from one another and this distance fulfilling the relationship mentioned above.

The invention further relates to a steel strip set, comprising a steel strip and a data container associated with the steel strip. In this case, the data container comprises a plurality of data sets with unique data set identifiers, each data set containing material properties of the steel strip at a discrete strip position and optionally the discrete strip position. In addition, the steel strip comprises a plurality of markers on the strip edge at discrete strip positions, with each marker from the plurality of markers comprising a unique material identifier which is assigned to a unique data set identifier such that this results in a unique assignment of each marker to a data set, with each marker being assigned to the data set which contains the material properties of its strip position.

In the case of the steel strip set, the data container can therefore be designed as a diagnostics file or a material database or a database object in a material database. The steel strip set can physically comprise the data container, for example if a data medium with the data container is delivered together with the steel strip. Alternatively, the steel strip set can also comprise the data container in the form of access authorization to an Internet storage facility, for example if a link to an online database of the steel manufacturer is made available with the steel strip upon delivery.

Such a steel strip set allows rapid further processing of the steel strip, since the material properties at a strip position of a marker can be read out of the data container in a simple manner. Consequently, a specific strip portion can be selectively removed, for example, if roughness requirements, for example, are not met. Alternatively, the manufacturing process can be specifically adapted to the thickness of the steel strip that is present at the strip position of the corresponding marker.

In a preferred development, the data container comprises a set of production parameters of the steel strip and/or a unique steel strip identifier. This additional information allows the further processing process to be controlled in a more targeted manner on the basis of the parameters. Furthermore, in the event of subsequently occurring material defects, it is easier to track the production step possibly responsible for the defect.

In a specific embodiment, each marker from the plurality of markers comprises an optically readable identification, in particular an alphanumeric character string, a bar code and/or a QR code. In particular, the material identifier contained in the marker is designed as an optically readable identification, in particular an alphanumeric character string, a bar code and/or a QR code.

Alternatively, each marker from the plurality of markers comprises a local structural change in the steel strip and/or a locally impressed remanent magnetic field. In particular, the material identifier contained in the marker is designed as a local structural change in the steel strip and/or a locally impressed remanent magnetic field.

Naturally, the marker can simultaneously have an above-described written, optically readable identification and a local structural change or a locally impressed remanent magnetic field. This increases redundancy if the same information is stored in two or three different ways.

In particular, the steel strip set is developed in such a way that the distance between adjacent markers is less than 2 m, in particular less than 1 m. This ensures that even with the usual divisions into smaller units, at least one marker remains on the sections.

The object according to the invention is likewise achieved by a steel strip with a plurality of markers on the strip edge at discrete strip positions, each marker from the plurality of markers containing at least one material property at its respective strip position in coded or uncoded form. This is advantageous in that the material properties can be read out directly from the marker, without requiring to access a data container. This simplifies the logistics, for example, because when the steel strip is sold, only the steel strip itself and no data containers are delivered.

In a preferred variant, each marker from the plurality of markers contains a set of production parameters and/or a unique steel strip identifier in coded or uncoded form. This information has the advantages already explained.

In a specific variant of the steel strip, each marker from the plurality of markers comprises an optically readable identification, in particular an alphanumeric character string, a bar code and/or a QR code. Alternatively or additionally, each marker from the plurality of markers comprises a local structural change in the steel strip and/or a locally impressed remanent magnetic field.

It is also advantageous in this embodiment variant of the invention if the distance between adjacent markers is less than 2 m, in particular less than 1 m.

The invention further relates to a method for processing an above-described steel strip set, comprising the following steps:
  reading at least one marker from the plurality of markers on the steel strip, the marker having a material identifier,
  reading out the data set assigned to the read material identifier and containing material properties at the strip position of the read marker from the data container,
  controlling a processing unit on the basis of the read-out material properties.

A plurality of markers on the strip edge are read out by, in particular, the steel strip being moved past a reading unit along the longitudinal direction of the said steel strip, with the reading unit being arranged adjacent to the strip edge. This allows a large number of markers to be efficiently read out from the edge of the strip. The reading unit can be an optical camera (in the case of optically readable identifications), eddy current or leakage flux sensors (in the case of local structural changes) or sensors sensitive to magnetic fields (in the case of impressed, remanent magnetic fields).

The advantage of this processing method is that it is possible during processing to react instantaneously to the read-out material properties. By way of example, the cutting or forming forces of the processing unit can be adapted to the mechanical/technological properties that are present at the corresponding strip position. In the case of local material defects in the surface (e.g., roughness values that are outside of the specification), the corresponding portion can be discarded during further processing.

In particular, the method is developed in such a way that it comprises the following steps:
  reading out a set of production parameters of the steel strip and/or the unique steel strip identifier from the data container,
  controlling a processing unit on the basis of the read-out production parameters and/or the read-out steel strip identifier.

The invention moreover relates to a method for processing an above-described steel strip with a plurality of markers on the strip edge at discrete strip positions, each marker from the plurality of markers containing at least one material property at its respective strip position in coded or uncoded form. In this case, the method comprises the following steps:
  reading out the at least one material property from a marker from the plurality of markers,
  controlling a processing unit on the basis of the read-out material properties.

In this method, the processing unit can be controlled directly on the basis of the read-out information without requiring access to a data container.

This method is developed in such a way in particular that it additionally comprises the following steps:
  reading out a set of production parameters of the steel strip and/or the unique steel strip identifier from a marker from the plurality of markers, controlling a processing unit on the basis of the read-out production parameters and/or the read-out steel strip identifier.

Figure 1B:
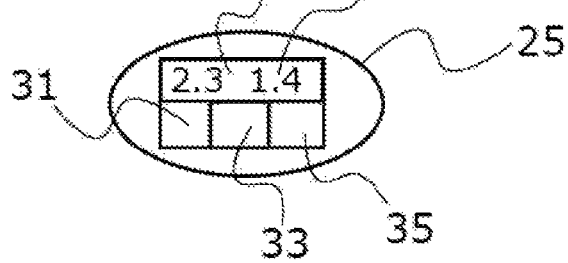
Figure 1C:
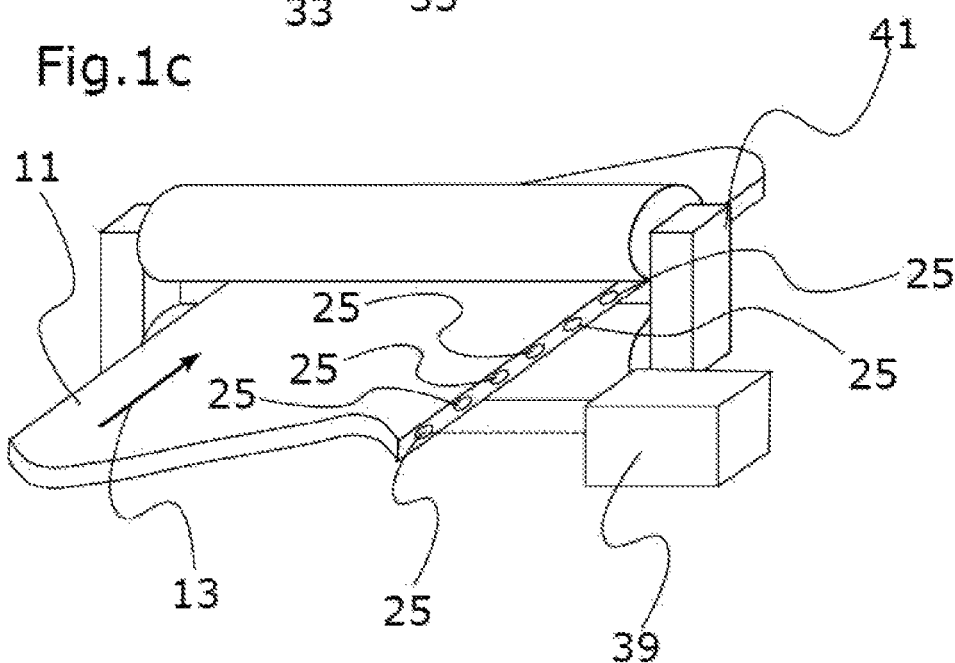

The invention is explained in more detail with reference to the figures. In the drawings:

FIG. 1a shows a schematic representation of the marking of a steel strip in a first embodiment, FIG. 1b shows an enlarged schematic representation of a marker, FIG. 1c shows a schematic representation of the processing of a steel strip in a first embodiment, FIG. 2a shows a schematic representation of the marking of a steel strip in a second embodiment, FIG. 2b shows a schematic representation of a data container, FIG. 2c shows an enlarged schematic representation of a marker, and FIG. 2d shows a schematic representation of the processing of a steel strip in a second embodiment, FIG. 1a shows a schematic representation of the processing of a steel strip in a first embodiment of the invention. A steel strip 11 which is moved along its longitudinal direction 13 is shown. In the process, the steel strip 11 moves past a measuring device 15 by means of which the local material properties of the steel strip 11 are measured at a plurality of discrete strip positions 17.

A discrete strip position 17 is understood to mean a position along the longitudinal side 19 of the steel strip. A material property present at a discrete strip position refers to material properties of a portion of the steel strip at this said position along the longitudinal side. This means that the material property is measured on a band 21 perpendicular to the longitudinal side 19 of the steel strip 11 at this position along the longitudinal side 19. However, this does not mean that the entire band 21 has to be measured. The material property can also be a local thickness in the center of the steel strip 11, for example. In such a case, a measurement is naturally only taken at one point of the band 21.

In the embodiment shown, the discrete strip positions 17 are additionally measured by the position measuring equipment 22. The position measuring equipment 22 is optional since the discrete strip positions 17 can also be calculated automatically on the basis of the known speed of the movement of the steel strip 11 in the longitudinal direction 13.

A plurality of markers 25 are applied to the strip edge 27 by means of the marking device 23. In this case, the marking device 23 is designed as a laser marking unit. The markers 25 each have the same distance 37 from one another in the longitudinal direction 13. For better clarity, the distance 37 is only depicted for two adjacent markers 25.

A marker 25 is shown enlarged in FIG. 1b. The marker 25 comprises a material identifier 29 which is designed as at least one material property 49 at its strip position in encoded form. By way of example, the material identifier is designed as two material properties 49, specifically the mean steel strip thickness of 2.3 mm and the mean roughness Rpm of 1.4 μm at this strip position. Moreover, the marker comprises a set of production parameters 31, a steel strip identifier 33, and the strip position 35 itself. For better clarity of the representation, only the empty fields without an entry are shown in FIG. 1b. The set of production parameters 31 and the steel strip identifier 33 can be stored in advance in a memory of the marking unit 23, while the material identifier 29 in the form of the material properties 49 is transmitted online by the measuring device 15. To this end, the measuring device 15 is signal connected to the marking unit 23 (represented by the dashed connecting lines). The strip position 35 can either be calculated or transmitted online by the position measuring equipment 22.

FIG. 1c shows the processing of a steel strip 11 which has been marked in the above-described manner. A steel strip 11 which is moved along its longitudinal direction 13 is shown. In the process, the steel strip 11 moves past a reading unit 39, by means of which the material properties of the steel strip 11, the production parameters 31, the steel strip identifier 33, and the strip position 35 are read out from the marker 25. A downstream processing unit 41 is controlled on the basis of these read-out values. To this end, the reading unit 39 is signal connected to the processing unit 41 (represented by the dashed connecting lines). The processing unit 41 is shown here by way of example as a rolling device with an upper and a lower roller.

FIG. 2a shows a schematic representation of the processing of a steel strip in a second embodiment of the invention. A steel strip 11 which is moved along its longitudinal direction 13 is shown. In the process, the steel strip 11 moves past a measuring device 15 by means of which the material properties of the steel strip 11 are measured at a plurality of discrete strip positions 17.

A discrete strip position 17 is understood to mean a position along the longitudinal side 19 of the steel strip. A material property present at a discrete strip position refers to material properties of a portion of the steel strip at this said position along the longitudinal side. This means that the material property is measured on a band 21 perpendicular to the longitudinal side 19 of the steel strip 11 at this position along the longitudinal side 19. However, this does not mean that the entire band 21 has to be measured. The material property can also be a local thickness in the center of the steel strip 11, for example. In such a case, a measurement is naturally only taken at one point of the band 21.

In the embodiment shown, the discrete strip positions 17 are additionally measured by the position measuring equipment 22. The position measuring equipment 22 is optional since the discrete strip positions 17 can also be calculated automatically on the basis of the known speed of the movement of the steel strip 11 in the longitudinal direction 13.

The measured material properties at the respective strip positions and the discrete strip positions are combined to form data sets 45 and a unique data set identifier 47 is assigned thereto. The data sets 45 are assigned to a data container 43 associated with the steel strip 11.

The data container 43 is shown schematically in FIG. 2b. Each row corresponds to a data set 45. The first column contains the unique data set identifier 47, the second column the material property 49, and the third column the strip position 35. For the sake of clarity, only six data sets are depicted. The data set identifier 47 is designed as a sequential number (1, . . . , 6). The steel strip thickness in mm and the mean roughness Rpm in μm are given in the second column as exemplary material properties. The third column gives the strip position 35 in mm from a reference point. The strip positions 35 and thus also the markers 25 are at a distance of 500 mm from one another.

The data container 43 furthermore contains a set of production parameters 31 and a unique steel strip identifier 33. These two pieces of information, which relate to the steel strip 11 as a whole, can be added to the data container 43 at any time.

A marker 25 is shown enlarged in FIG. 2c. The marker 25 comprises a material identifier 29 which is designed as a unique material identifier and is assigned to exactly one unique data set identifier 47. By way of example, the material identifier is designed as a bar code 51 which refers to the corresponding data set 45 with the assigned data set identifier 47.

The plurality of markers 25 were applied to the strip edge 27 by means of the marking device 23 (see FIG. 2a). In this case, the marking device 23 is designed as a laser marking unit. The markers 25 each have the same distance 37 from one another in the longitudinal direction 13. For better clarity, the distance 37 is only depicted for two adjacent markers 25.

FIG. 2d shows the processing of a steel strip set 53, comprising a steel strip 11 and a data container 43, which has been marked in the above-described manner. A steel strip 11 which is moved along its longitudinal direction 13 is shown. In the process, the steel strip 11 moves past a reading unit 39 by means of which the material identifier 29 of the steel strip 11 is read out from the marker 25. The material identifier 29 is transmitted to a control unit 55. To this end, the reading unit 39 is signal connected to the control unit 55 (represented by the dashed lines). The control unit 55 is signal connected to the data container 43 and reads out the data set 45 assigned to the read-out material identifier 29 and containing material properties 49 at the strip position of the read marker 25 from the data container 43. Optionally, the control unit moreover reads out the production parameters 31 and/or the steel strip identifier 33 from the data container 43. A downstream processing unit 41 is controlled on the basis of these read-out values. To this end, the control unit 55 is signal connected to the processing unit 41 (represented by the dashed connecting lines). The processing unit 41 is shown here by way of example as a rolling device with an upper and a lower roller.

LIST OF REFERENCE SIGNS

11 Steel strip
13 Longitudinal direction
15 Measuring device
17 Strip positions
19 Longitudinal side
21 Band
22 Position measuring equipment
23 Marking unit
25 Marker
27 Strip edge
29 Material identifier
31 Set of production parameters
33 Steel strip identifier
35 Strip position (in the marker)
37 Distance between two adjacent markers
39 Reading unit
41 Processing unit
43 Data container
45 Data set
47 Data set identifier
49 Material property
51 Bar code
53 Steel strip set
55 Control unit

The invention claimed is:

1. A steel strip set, comprising a steel strip and a data container associated with the steel strip, the steel strip having a longitudinal side and a strip edge, wherein the data container comprises a plurality of data sets with unique data set identifiers, with each data set containing material properties of the steel strip, the steel strip having a plurality of markers applied to the strip edge along the longitudinal side at a plurality of discrete strip positions, each marker from the plurality of markers comprising a unique material identifier associated with the material properties of the steel strip at the respective discrete strip position, which is assigned to a unique data set identifier such that this results in a unique assignment of each marker to a data set, with each marker being assigned to the data set which contains the material properties of its respective strip position of the plurality of discrete strip positions.

2. The steel strip set as claimed in claim 1, wherein at least one of the data containers comprises a set of production parameters of the steel strip and the data container comprises a unique steel strip identifier.

3. The steel strip set as claimed in claim 2 wherein each marker from the plurality of markers comprises an optically readable identification including at least one of an alphanumeric character string, a bar code and a QR code.

4. The steel strip set as claimed in claim 3 wherein each marker from the plurality of markers comprises at least one of a local structural change in the steel strip and a locally impressed remanent magnetic field.

5. The steel strip set as claimed in claim 4 wherein the distance between adjacent markers is less than 1 m.

6. The steel strip as claimed in claim 1, wherein each marker from the plurality of markers contains a set of production parameters and a unique steel strip identifier in coded or uncoded form.

7. The steel strip set of claim 1 wherein the markers of the plurality of markers are applied to the strip edge at regular intervals.

8. The steel strip set of claim 1 wherein the material properties includes at least one of a mean strip thickness and a mean roughness.

* * * * *